(12) United States Patent
Shin et al.

(10) Patent No.: US 11,652,375 B2
(45) Date of Patent: May 16, 2023

(54) STATOR AND METHOD FOR MANUFACTURING THE SAME

(71) Applicant: LG Magna e-Powertrain Co., Ltd., Incheon (KR)

(72) Inventors: Hojun Shin, Seoul (KR); Wonjung Sung, Seoul (KR); Gyeongjae Park, Seoul (KR); Jeongmin Lee, Seoul (KR)

(73) Assignee: LG Magna e-Powertrain Co., Ltd., Incheon (KR)

(*) Notice: Subject to any disclaimer, the term of this patent is extended or adjusted under 35 U.S.C. 154(b) by 303 days.

(21) Appl. No.: 17/039,860

(22) Filed: Sep. 30, 2020

(65) Prior Publication Data
US 2021/0296947 A1   Sep. 23, 2021

(30) Foreign Application Priority Data
Mar. 17, 2020 (KR) .................. 10-2020-0032811

(51) Int. Cl.
| | | |
|---|---|---|
| *H02K 1/16* | (2006.01) | |
| *H02K 3/12* | (2006.01) | |
| *H02K 3/28* | (2006.01) | |
| *H02K 3/34* | (2006.01) | |
| *H02K 3/50* | (2006.01) | |
| *H02K 15/02* | (2006.01) | |
| *H02K 15/10* | (2006.01) | |
| *H02K 15/12* | (2006.01) | |

(52) U.S. Cl.
CPC ............ *H02K 1/165* (2013.01); *H02K 3/12* (2013.01); *H02K 3/28* (2013.01); *H02K 3/345* (2013.01); *H02K 3/505* (2013.01); *H02K 15/024* (2013.01); *H02K 15/10* (2013.01); *H02K 15/12* (2013.01)

(58) Field of Classification Search
CPC .. H02K 3/32; H02K 3/34; H02K 3/38; H02K 15/10
See application file for complete search history.

(56) References Cited

U.S. PATENT DOCUMENTS

2012/0274156 A1* 11/2012 Chamberlin ............. H02K 1/16
                                                       310/58

FOREIGN PATENT DOCUMENTS

| JP | 2000-209802 A | 7/2000 |
|---|---|---|
| JP | 2000209802 A * | 7/2000 |

(Continued)

OTHER PUBLICATIONS

Machine translation of JP 2000209802 A retrieved from internal search (Year: 2000).*

(Continued)

*Primary Examiner* — Ahmed Elnakib
*Assistant Examiner* — Minki Chang
(74) *Attorney, Agent, or Firm* — Birch, Stewart, Kolasch & Birch, LLP

(57) ABSTRACT

Disclosed herein are a stator and a method for manufacturing the same. The stator according to embodiments of the present disclosure includes an insulating part and a plurality of stator coils each having two ends electrically connected to form one joint portion. The insulating part is configured to cover at least respective parts of the joint portions, and to provide a distance between neighboring joint portions. Accordingly, a partial discharge caused by a surge between the joint portions of the stator coils may be prevented, allowing operational reliability of the stator to be increased.

17 Claims, 14 Drawing Sheets

(56) References Cited

FOREIGN PATENT DOCUMENTS

| | | |
|---|---|---|
| JP | 2013-115832 A | 6/2013 |
| JP | 2014-023210 A | 2/2014 |
| WO | WO 2020/120626 A1 | 6/2020 |

OTHER PUBLICATIONS

European Search Report for European Patent Application No. 20206949.8 dated Apr. 16, 2021 (10 pages).

* cited by examiner

STATOR AND METHOD FOR MANUFACTURING THE SAME

CROSS-REFERENCE TO RELATED APPLICATION

Pursuant to 35 U.S.C. § 119(a), this application claims the benefit of the earlier filing date and the right of priority to Korean Patent Application No. 10-2020-0032811, filed on Mar. 17, 2020, the contents of which are incorporated by reference herein in their entirety.

TECHNICAL FIELD

The present disclosure relates to a stator including a stator coil having ends to be joined.

BACKGROUND

An electric motor is an electrical machine that generates a rotational force using electrical energy. Most electric motors include a housing, a stator disposed inside the housing, and a rotor disposed inside the stator and rotated by a magnetic field generated in the stator.

Meanwhile, the stator may include a stator core and a plurality of stator coils respectively wound around the stator core. In addition, each of the stator coils may be wound on the stator core in a U-shape to have two ends adjacent to each other. For electric connection, the two adjacent ends of each of the stator coils may be welded together to form one end.

Welded ends of the plurality of stator coils may be spaced apart from one another in a radial direction of the stator core by a predetermined interval (or gap). Here, a partial discharge may occur in the ends of the stator coils caused by a surge due to a large potential difference therebetween, as the electric motor is driven by a high voltage.

Thus, in order to prevent the partial discharge between the ends of the stator coils, a minimum distance for preventing the surge between the ends of the stator coils may be secured. In addition, a measure for securely maintaining a predetermined distance between the ends of the stator coils may be considered.

In the related art stator, a stator manufacturing process that includes epoxy coating (or application) performed on welded ends of stator coils for insulation has been introduced. However, such epoxy coating on the welded ends of the stator coils has drawbacks. For instance, it may be difficult to evenly or uniformly apply liquid or powder epoxy to each of the ends of the stator coils, and thus some areas (or portions) may not be properly coated with epoxy. As a result, operational reliability of the stator may be reduced.

SUMMARY

One aspect of the present disclosure is to provide a stator capable of maintaining a distance between welded joint ends of stator coils.

Another aspect of the present disclosure is to provide a stator capable of securely maintaining a coupled state between an insulating part, provided on ends of stator coils for insulation, and the ends of the stator coils.

Still another aspect of the present disclosure is to provide a stator capable of eliminating epoxy coating (or application), which is performed for insulating ends of stator coils, from the conventional stator manufacturing process.

Embodiments disclosed herein provide a stator that may include: a stator core having a plurality of slots; a plurality of stator coils inserted into the plurality of slots to be wound on the stator core, and each having two ends electrically connected to form one joint portion; an insulating part made of a dielectric material, formed as a single body, having a plurality of openings, inserted into each of the joint portions through the openings to cover at least respective parts of the joint portions, and configured to provide a distance between neighboring joint portions.

The openings may be provided at one side of the insulating part, and the insulating part may have a shape in which an opposite side of the one side where the openings are provided is closed.

Each of the stator coils may include a first conductor and a second conductor through which electric current flows and defining the two ends of the stator coil, respectively, and covering portions designed to cover respective parts of the first and second conductors, excluding the joint portion, to provide protection. The insulating part may partially cover the covering portions.

The insulating part may further include a support portion protruding from an inner surface thereof and configured to be elastically deformable.

The support portion may be disposed at a position that faces the covering portion while the insulating part is inserted into the joint portion, and pressed by the covering portion to be supported thereon.

The support portion may be disposed at a position that faces at least one of the first and second conductors while the insulating part is inserted into the joint portion, and pressed by at least one of the first and second conductors to be supported on the at least one of the first and second conductors.

The support portion may have a hemisphere shape.

The support portion may extend on an inner surface of the insulating part along a perimeter of the insulating part.

The insulating part may further include a plurality of accommodation spaces partitioned from each other and inserted into each of the joint portions. Each of the accommodation spaces may have a first inner diameter defining an area that surrounds the joint portion and a second inner diameter defining an area that surrounds the covering portions, so that the insulating part is engagingly supported by the covering portions while being inserted into the joint portion.

The insulating part may include a first insulating portion and a second insulating portion made of different types of dielectric materials. The first insulating portion may define any one portion of the insulating part, and the second insulating portion may define another portion of the insulating part.

The first insulating portion may define an inner side of the insulating part and have a first elastic force, and the second insulating portion may define an outer side of the insulating part and have a second elastic force less than the first elastic force.

The insulating part may further include an adhesive layer provided on an inner surface thereof and implemented as an adhesive.

The insulating part may include a first portion defining an upper surface thereof, and a second portion defining a side surface thereof. A thickness of the first portion may be less than a thickness of the second portion.

The dialectic material may have a dielectric constant of 3 to 5.

The dielectric material may include at least one of Polyimide (PI), Polyamideimide (PAI), and Polyetheretherketone (PEEK).

The plurality of stator coils may be spaced apart from one another along a circumference of the stator core by a predetermined interval. The insulating part may have a ring shape to cover all of the joint portions of the plurality of stator coils.

Embodiments disclosed herein also provide a method for manufacturing a stator, the method may include: welding two ends of each of stator coils wound on a stator core to form one joint portion; inserting an insulating part, made of a dietetic material, formed as a single body, and provided with a plurality of openings, into the joint portions through the openings to be fixed; impregnating a coating material into the stator coils to form a film thereon; and curing the coating material impregnated into the stator coils.

The coating material impregnated into the stator coils and cured may be varnish.

DETAILED DESCRIPTION

Hereinafter, description will be given in more detail of a stator 100 according to the present disclosure, with reference to the accompanying drawings.

For the sake of brief description with reference to the drawings, the same or equivalent components may be provided with the same or similar reference numbers, and description thereof will not be repeated.

A singular representation may include a plural representation unless it represents a definitely different meaning from the context.

Figure 1A:
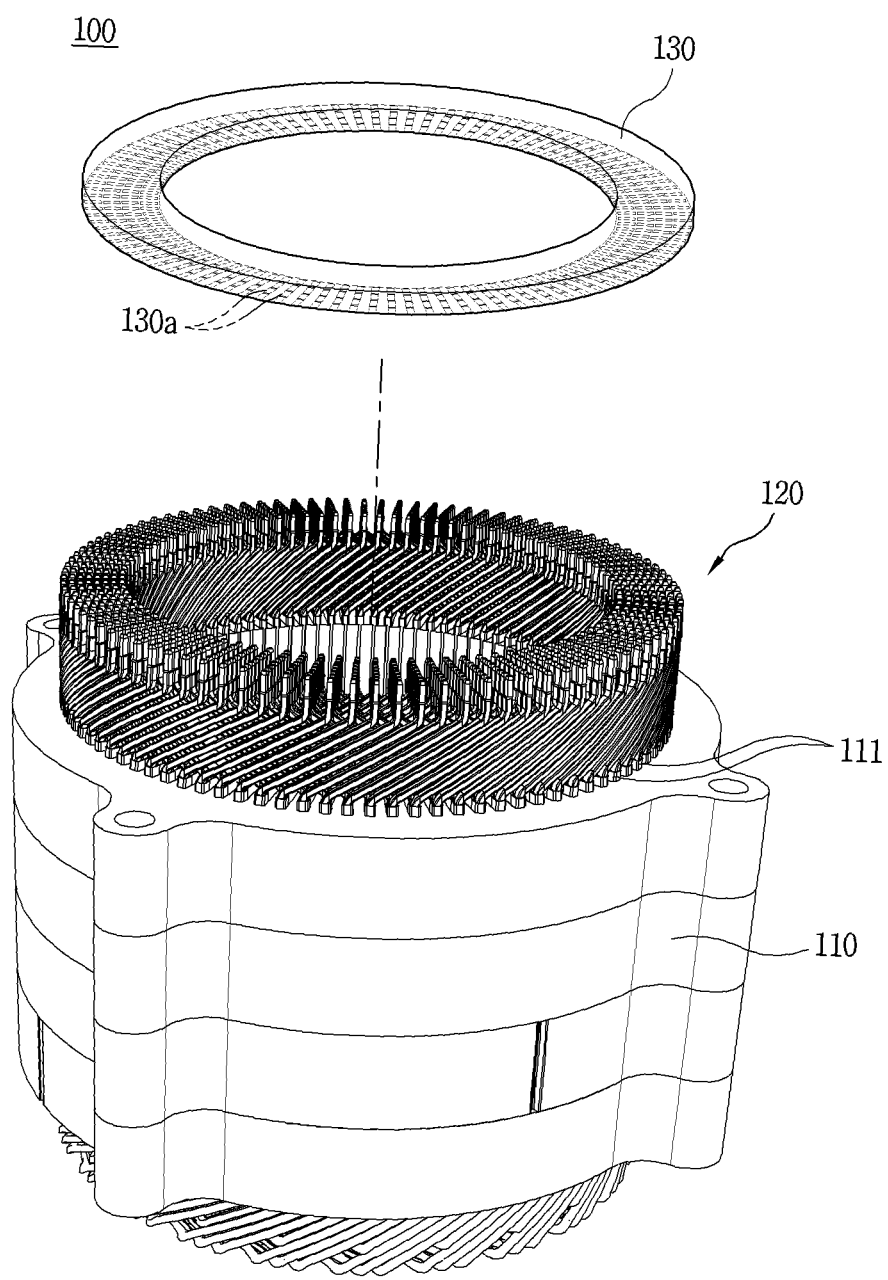
FIG. 1A is a perspective view illustrating a state in which an insulating part is separated from a stator according to one embodiment of the present disclosure.
Figure 1B:
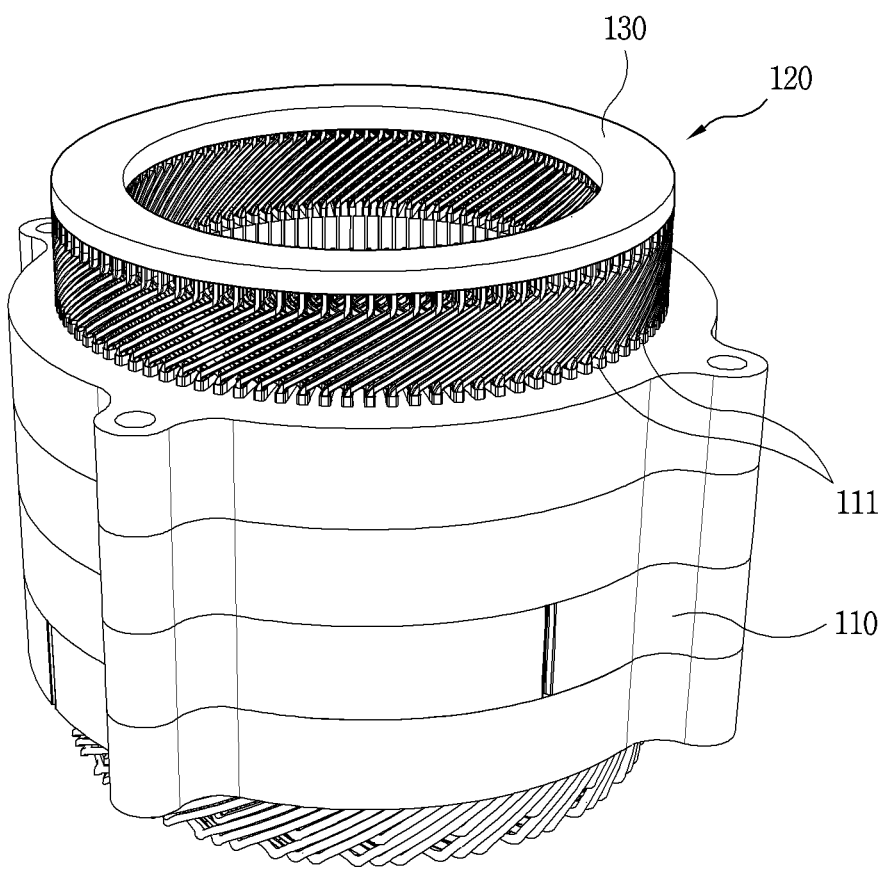
FIG. 1B is a perspective view illustrating a state in which an insulating part is coupled to an end of a stator coil in FIG. 1A.
Figure 2:
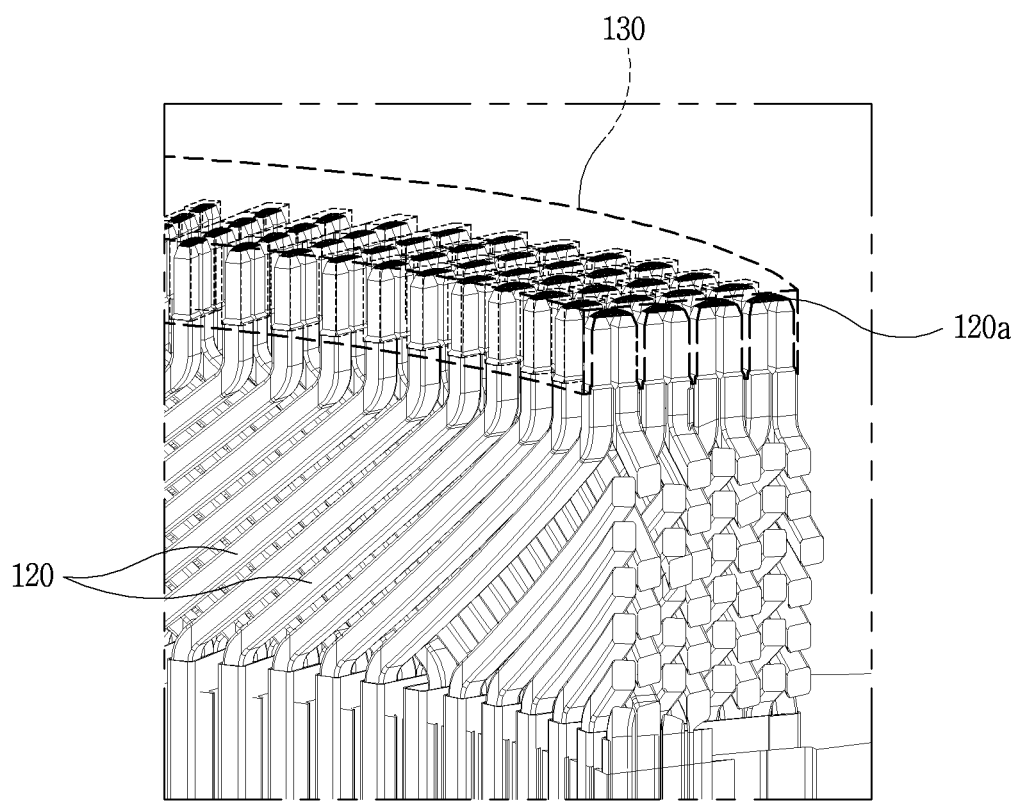
FIG. 2 is an enlarged view schematically illustrating a state in which an insulating part is coupled to an end of a stator coil in FIG. 1A.
Figure 3A:
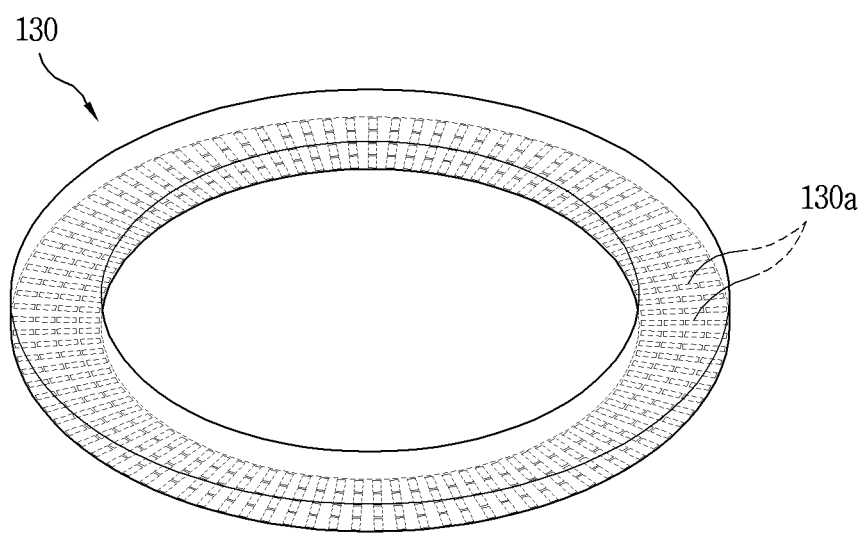
FIG. 3A is a perspective view of the insulating part in FIG. 1A, viewed from above.
Figure 3B:
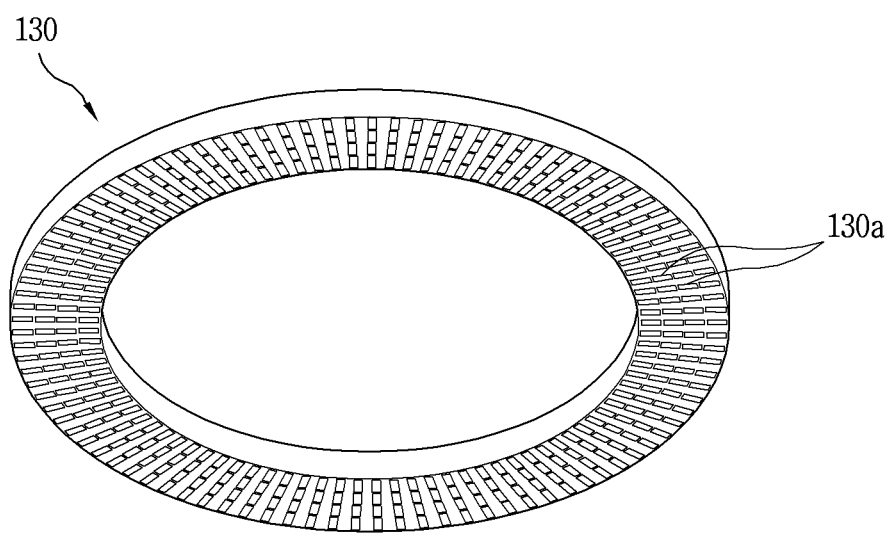
FIG. 3B is a perspective view of the insulating part in FIG. 1A, viewed from the bottom.
Figure 4:
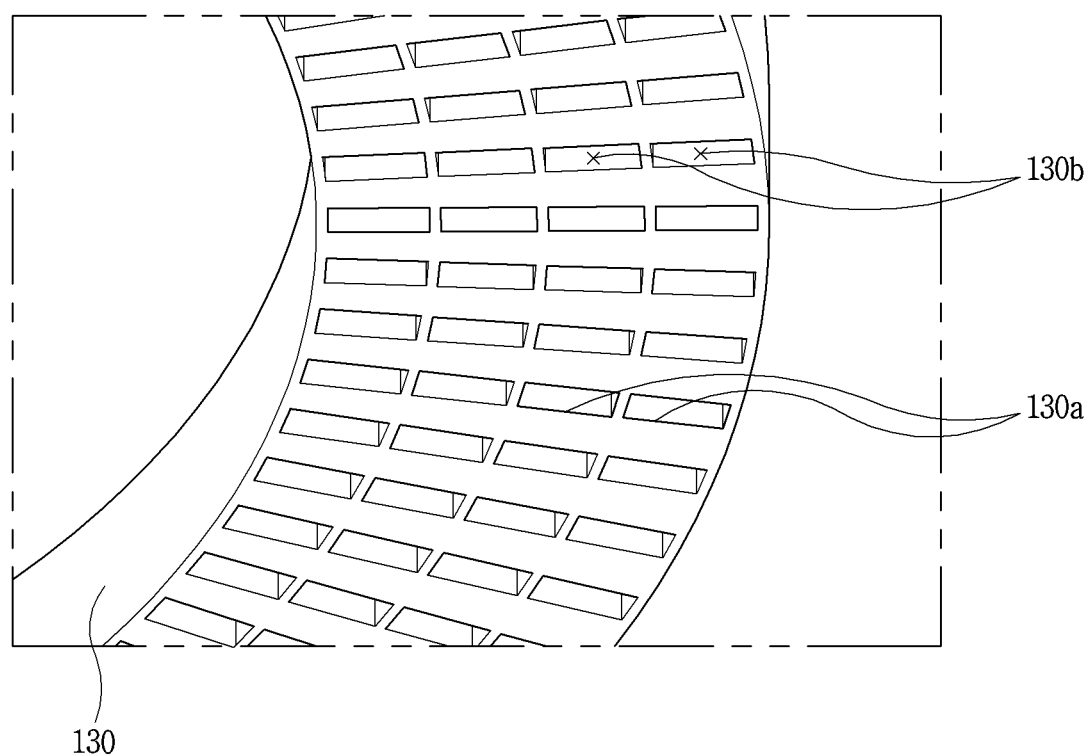
FIG. 4 is an enlarged view illustrating a portion of the insulating part in FIG. 3B.
Figure 5:
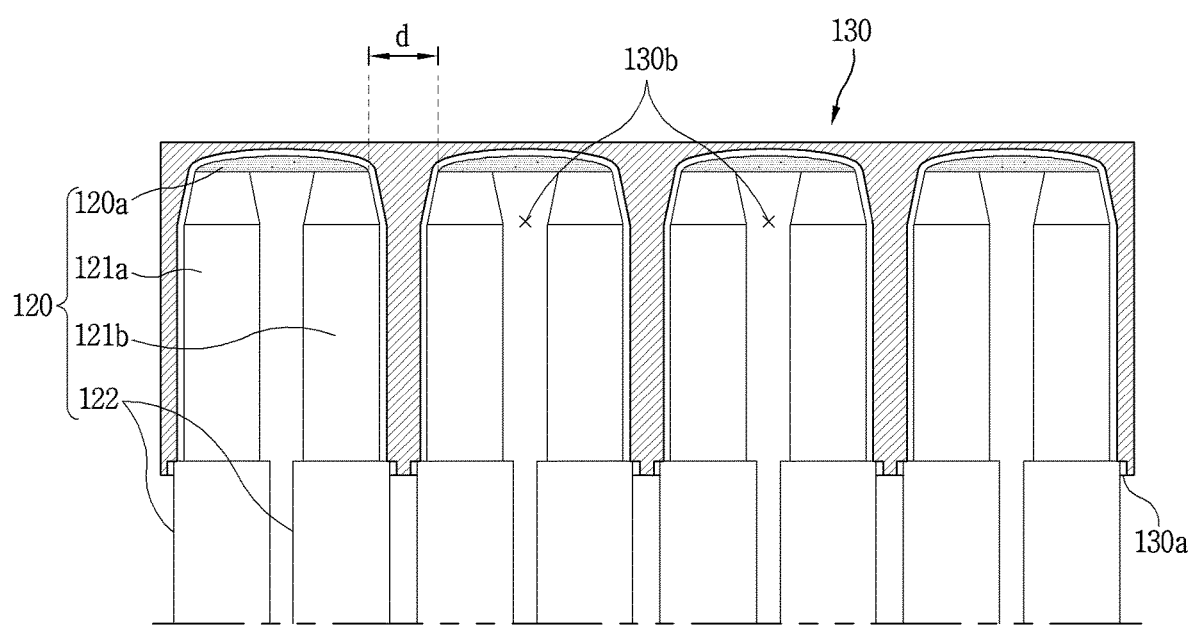
FIG. 5 is a schematic view illustrating a state in which an insulating part is coupled to an end of a stator coil in FIG. 1A.
Figure 6:
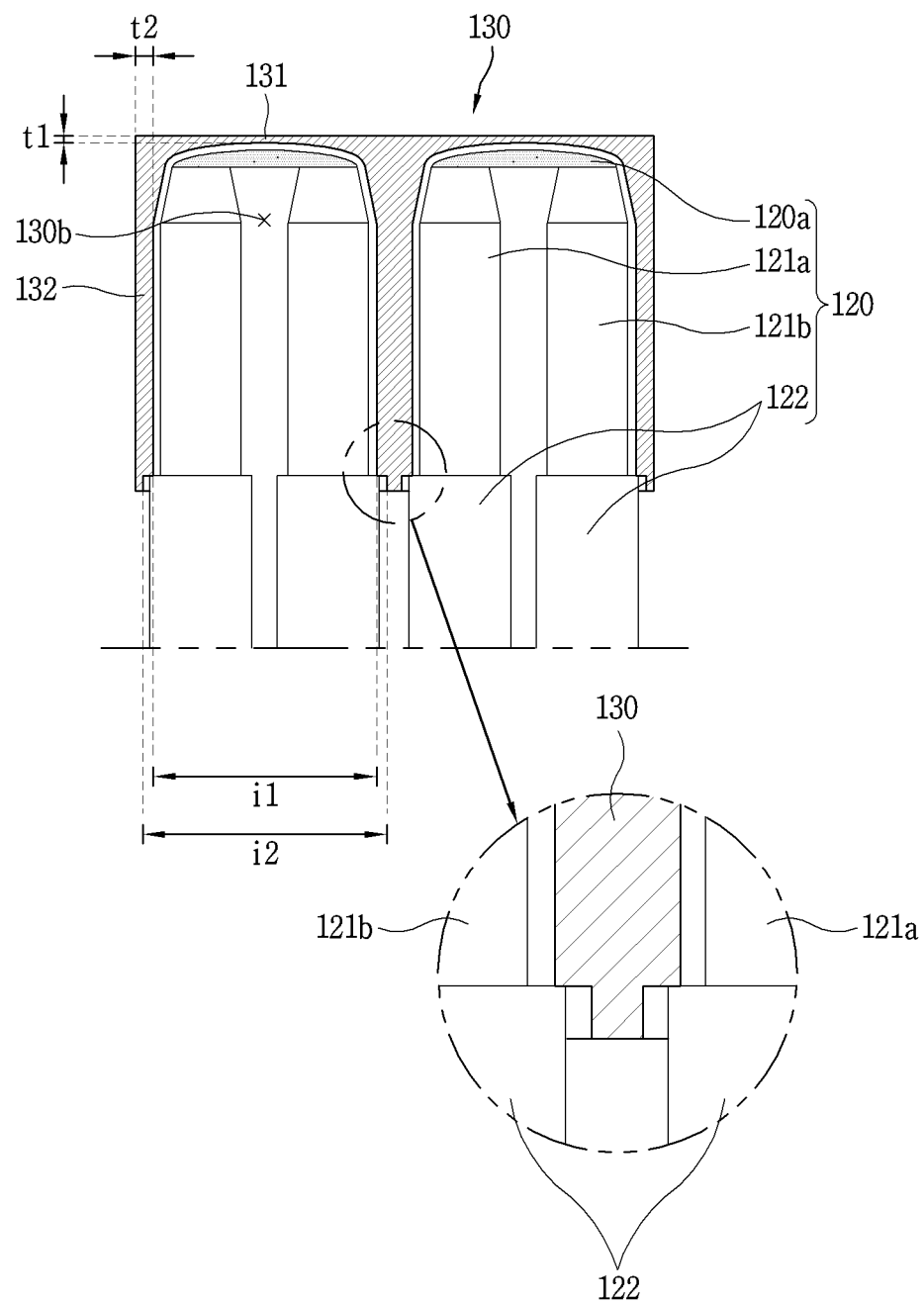
FIG. 6 is a schematic view illustrating a portion of an insulating part for explaining a structure of the insulating part coupled to an end of a stator coil in FIG. 1A.

FIG. 1A is a perspective view illustrating a state in which an insulating part 130 is separated from a stator 100 according to one embodiment of the present disclosure; FIG. 1B is a perspective view illustrating a state in which the insulating part 130 is coupled to an end of a stator coil 120 in FIG. 1A; FIG. 2 is an enlarged view schematically illustrating a state in which the insulating part 130 is coupled to the end of the stator coil 120 in FIG. 1A; FIG. 3A is a perspective view of the insulating part 130 in FIG. 1, viewed from above; FIG. 3B is a perspective view of the insulating part 130 in FIG. 1A, viewed from the bottom; FIG. 4 is an enlarged view illustrating a portion of the insulating part 130 in FIG. 3B; FIG. 5 is a schematic view illustrating a state in which the illustrating part 130 is coupled to the end of the stator coil 120 in FIG. 1A; and FIG. 6 is a schematic view illustrating a portion of the insulating part 130 for explaining a structure of the insulating part 130 coupled to the end of the stator coil 120 in FIG. 1A.

Referring to FIGS. 1A to 6, the stator 100 includes a stator core 110, the stator coil 120, and the insulating part 130.

The stator core 110 is provided with a plurality of slots 111 through which a plurality of stator coils 120, which will be described hereinafter, is wound. A rotor (not shown) may be disposed inside the stator core 110. The rotor (not shown) may be configured to rotate in one direction by a rotating magnetic field generated in the stator 100.

Each of the stator coils 120 may be inserted into the plurality of the slots 111 to be wound on the stator core 110, and two ends thereof may be electrically connected to form one joint (or junction) portion 120a. The joint portion 120a may be achieved or formed by welding. The stator coil 120 may be provided in plurality. Each of the stator coils 120 may be formed in, for example, a U-shape to be wound around the stator core 110. The two ends of the stator coil 120 may be made of bare copper that is uncoated.

The stator coil 120 may include a first conductor 121a, a second conductor 121b, and covering portions (or sheath) 122.

The first conductor 121a and the second conductor 121b are made of an electrically conductive material, so as to allow an electric current to flow therethrough. The first conductor 121a and the second conductor 121b may define the two ends of the stator coil 120, respectively.

The covering portions 122 may cover respective parts or portions of the first and second conductors 121a and 121b, excluding the joint portion 120a of the stator coil 120. In addition, the covering portions 122 may be made of an insulating material.

Meanwhile, as shown in FIGS. 1 to 3, the joint portions 120a of the plurality of stator coils 120 may be spaced apart from one another in a radial direction of the stator core 110 by a predetermined interval (or gap) to form a plurality of layers. Here, a partial discharge may occur between neighboring joint portions 120a of the stator core 110 due to a surge caused by a large potential difference.

The surge refers to an excessive waveform generated when an abnormally high power or voltage lasts for a specific period of time. When a massive amount of electricity flowing into an electrical or power line circuit lasts for a short period of time, electricity may be cut off due to an excessive waveform. Accordingly, when designing the stator 100, measures for securing and maintaining a distance d, which is a minimum distance required for preventing a partial discharge caused by the surge between the joint portions 120a of the stator coils 120, should be considered.

The stator 100 of the present disclosure includes the insulating part 130 to secure and maintain the distance d required between the joint portions 120a of the stator coils 120, and to insulate the joint portions 120a.

The insulating part 130 is made of a dielectric material (or dielectric) and has a plurality of openings 130a, as illustrated. The openings 130a of the insulating part 130 may be provided at one side of the insulating part 130. In addition, the insulating part 130 may have a shape in which an opposite side of the one side where the openings 130a are provided is closed. The insulating part 130 may be provided with a plurality of accommodation (or accommodating) spaces 130b partitioned (or divided) from each other and inserted into the joint portions 120a of the stator coils 120. The openings 130a may communicate with the accommodation spaces 130b. In addition, the insulating part 130 is inserted into each of the joint portions 120a through the openings 130, so as to cover at least respective parts of the joint portions 120a.

The plurality of accommodation spaces 130b provided in the insulating part 130 is partitioned from each other with a predetermined interval therebetween, so as to allow the distance d between neighboring joint portions 120a of the stator coils 120 to be maintained.

In addition, the dielectric material has insulating properties that do not allow electricity to flow therethrough. The dielectric constant (permittivity) of the dietetic material is 3 to 5, for example. Here, in the case of the dietetic material having the dielectric constant of less than 3, it is advantageous to increase insulation performance of the insulating part 130. However, it is not suitable for achieving a structure of the insulating part 130 and using in the stator 100. When the dielectric constant of the dielectric material exceeds 5, insulation performance required for the insulating part 130 may not be ensured.

For example, the dielectric material constituting the insulating part 130 may include at least one of Polyimide (PI), Polyamide-imide (PAI), and Polyetheretherketone (PEEK).

Meanwhile, the plurality of stator coils 120 may be disposed to be spaced apart from one another along a circumference of the stator core 110 at a predetermined interval, as illustrated in FIG. 1A. Here, the insulating part 130 may be formed in a ring shape so as to cover all of the joint portions 120a of the plurality of stator coils 120, and formed as a single body.

Meanwhile, the insulating part 130 may include a first portion 131 and a second portion 132.

The first portion 131 may define an upper surface of the insulating part 130.

The second portion 132 may define a side (or lateral) surface of the insulating part 130.

Here, a thickness t1 of the first portion 131 may be less than a thickness t2 of the second portion 132. In such a structure of the first and second portions 131 and 132, the thickness t2 of the side surface of the insulating part 130 having a larger area for a possible (or potential) partial discharge caused by a surge between neighboring joint portions 120a of the stator coils 120 is greater (or thicker) than the thickness t1 of the upper surface of the insulating part 130 having a smaller area for a possible partial discharge caused by the surge, thereby reducing material costs for manufacturing the insulating part 130.

In addition, the insulating part 130 may partially cover the covering portions 122 of each of the stator coils 120. That is, the insulating part 130 and the covering portions 122 may partially overlap with each other. With this structure, the insulating part 130 not only covers the joint portion 120a of the stator coil 120 and the first and second conductors 121a and 121b, but also partially covers the covering portions 122, thereby further improving insulation in the joint portion 120a and the first and second conductors 121a and 121b.

Meanwhile, the insulating part 130 may be formed such that each of the plurality of accommodation spaces 130b partitioned from one another and inserted into the joint portions 120a has a first inner diameter i1 defining an area (or region) that surrounds the joint portion 120a, and a second inner diameter i2 defining an area that surrounds the covering portions 122. Here, the insulating part 130 may be engagingly supported by the covering portions 122 of the stator coil 120 while being inserted into the joint portion 120a. The first inner diameter i1 may be less (or smaller) than the second inner diameter i2.

With such a structure of the insulating part 130, when the insulating part 130 is inserted into the joint portions 120a to be coupled, the insulating part 130 may be securely coupled to the joint portions 120a at a predetermined position. In addition, in the process of coupling the insulating part 130 to the joint portions 120a, damage to the insulating part 130 and/or damage to the joint portions 120a caused by excessive insertion of the insulating part 130 may be reduced.

Hereinafter, other examples of the insulating part 130 illustrated in FIG. 6 will be described with reference to FIGS. 7 to 11.

Figure 7:
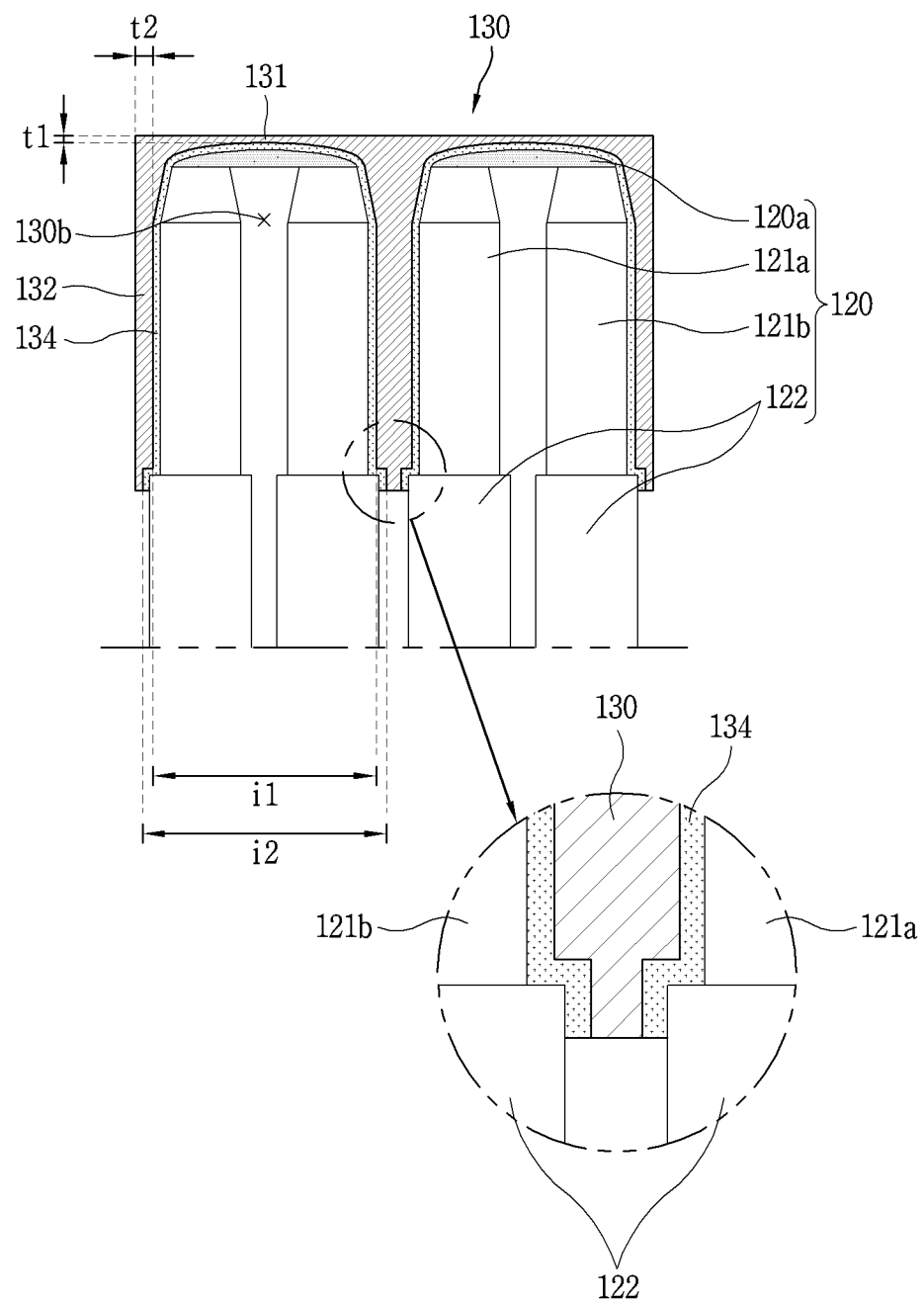
FIG. 7 is a schematic view illustrating another example of the insulating part in FIG. 6.
Figure 8:
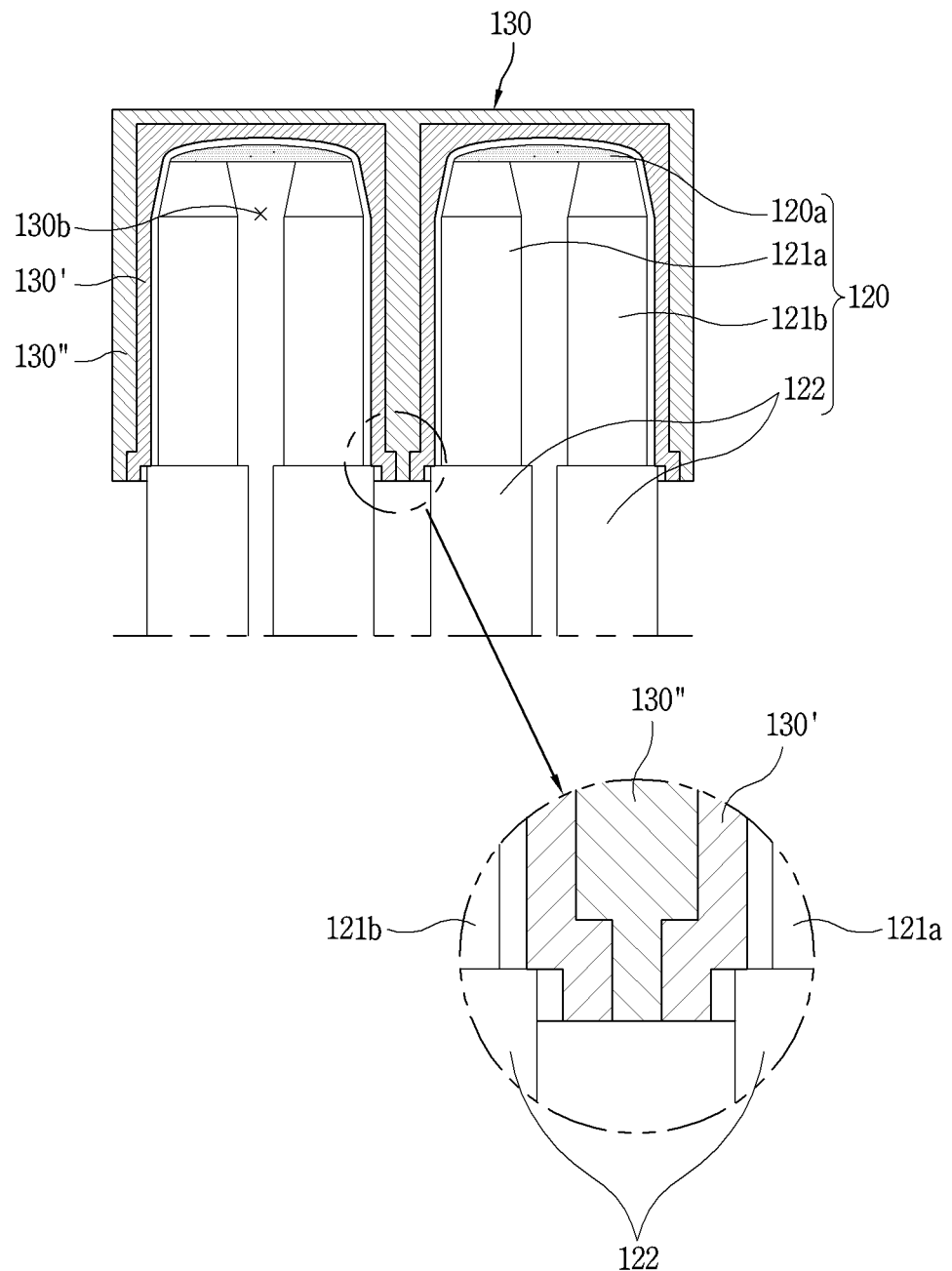
FIG. 8 is a schematic view illustrating another example of the insulating part in FIG. 6.
Figure 9:
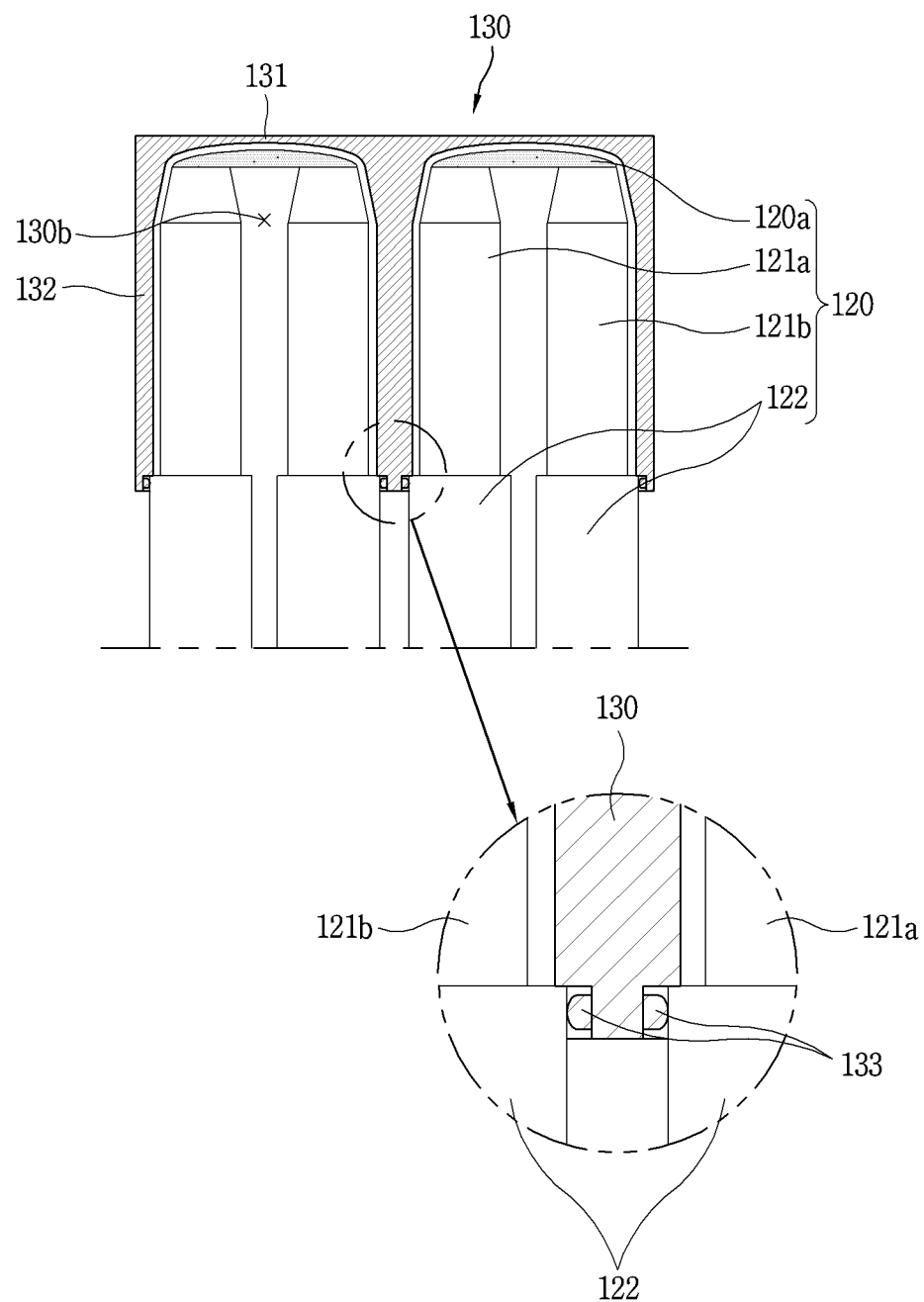
FIG. 9 is a schematic view illustrating another example of the insulating part in FIG. 6.
Figure 10:
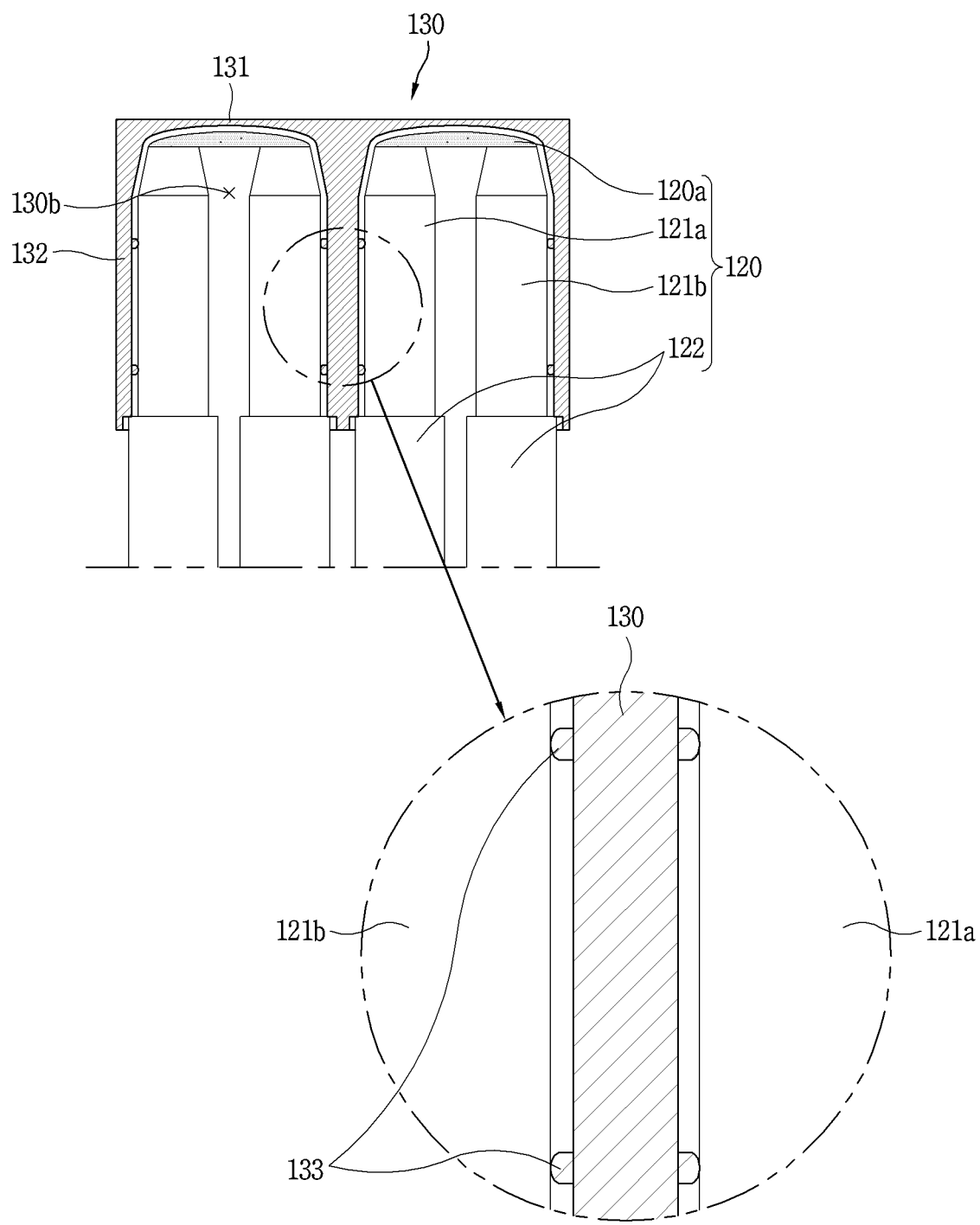
FIG. 10 is a schematic view illustrating another example of the insulating part in FIG. 6.
Figure 11:
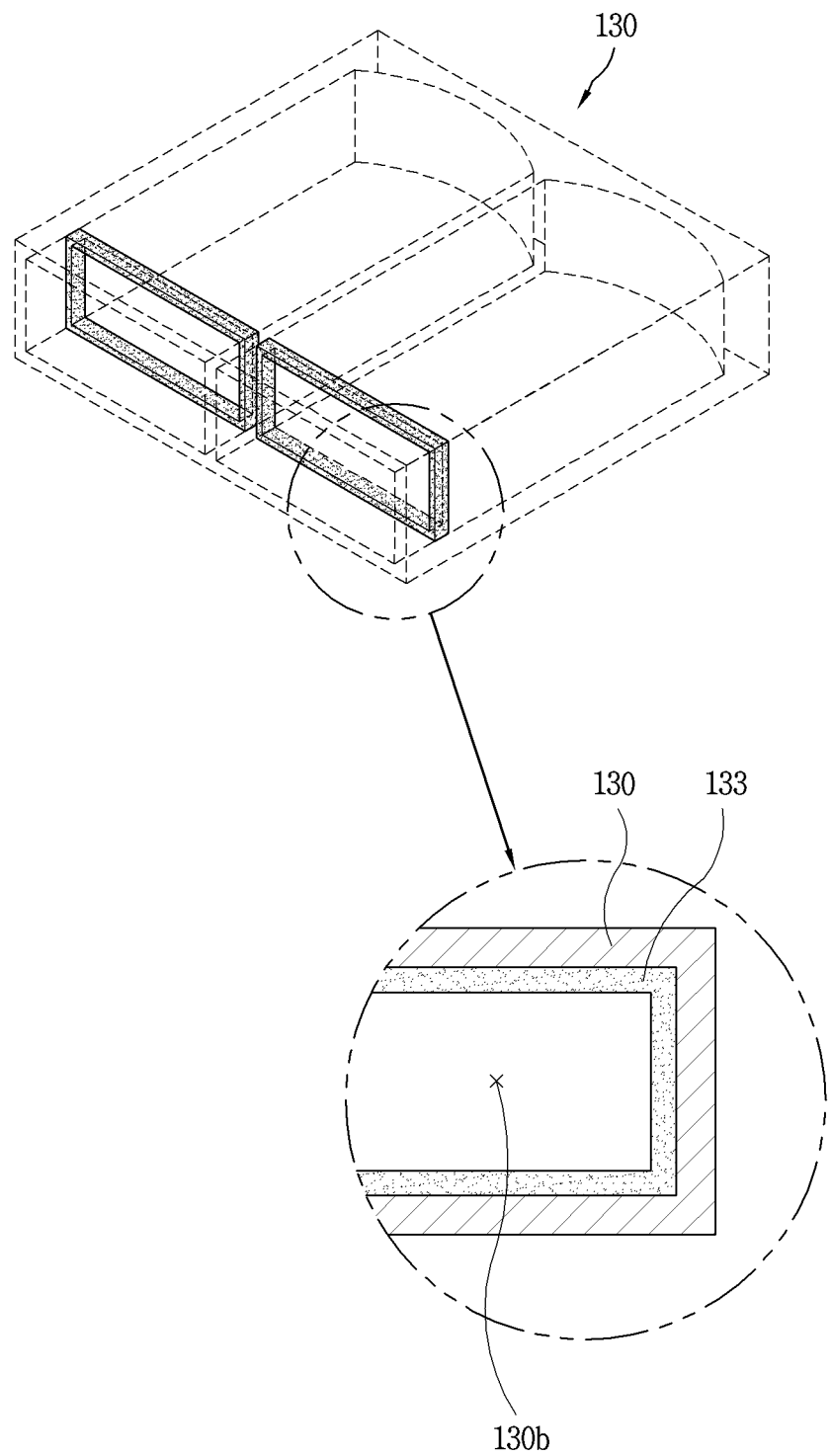
FIG. 11 is a schematic view illustrating another example of the insulating part in FIG. 6, viewed from the bottom.

FIG. 7 is a schematic view illustrating another example of the insulating part 130 in FIG. 6; FIG. 8 is a schematic view illustrating another example of the insulating part 130 in FIG. 6; FIG. 9 is a schematic view illustrating another example of the insulating part 130 in FIG. 6; FIG. 10 is a schematic view illustrating another example of the insulating part 130 in FIG. 6; and FIG. 11 is a schematic view illustrating another example of the insulating part 130 in FIG. 6, viewed from the bottom.

Referring to FIG. 7, the insulating part 130 may further include an adhesive layer 134.

As illustrated in FIG. 7, the adhesive layer 134 is provided on an inner surface of the insulating part 130. The adhesive layer 134 may be implemented as an adhesive. While the insulating part 130 is inserted into the joint portions 120a of the stator coils 120, the adhesive layer 134 may be adhered and fixed to contacted or touched joint portions 120a, the first and second conductors 121a and 121b, and the covering portions 122. Accordingly, when the insulating part 130 is insertedly coupled to the joint portions 120a, the insulating part 130 may be securely coupled to the joint portions 120a. The adhesive layer 134 may be provided in the form of a liquid or solid such as powder.

Next, referring to FIG. 8, the insulating part 130 may include a first insulating portion 130' and a second insulating portion 130" made of different types of dielectric materials. Here, the first insulating portion 130' may define any one portion of the insulating part 130, and the second insulating portion 130" may define another portion of the insulating part 130. The first and second insulating portions 130' and 130" may allow the insulating part 130 to have more various insulation properties, compared to the insulating part 130 made of one kind of the dielectric material.

Meanwhile, the first insulating portion 130' may define an inner side of the insulating part 130 and have a first elastic force. The second insulating portion 130" may define an outer side of the insulating part 130 and have a second elastic force which is less than the first elastic force.

By doing so, when some ends of the stator coils 120, which define the joint portions 120*a*, have different bending degrees, or when some of the joint portions 120*a* have different shapes, ends of the stator coils 120 or the first insulating portions 130' in contact with the joint portions 120*a* are elastically deformed. This allows the insulating part 130 to be coupled to the joint portions 120*a* in an easier manner without being stuck or caught. In addition, while the second insulating portion 130" has an elastic force less than the first insulating portion 130', it protects ends of the stator coils 120 and/or joint portions 120*a* provided inside the insulating part 130 from external impact, or the like, thereby preventing damage to them.

Referring to FIGS. 9 and 11, the insulating part 130 may further include a support portion 133.

The support portion 133 may protrude from the inner surface of the insulating part 130, and configured to be elastically deformable. Meanwhile, the support portion 133 may be provided in plurality. In addition, the support portion 133 may have a hemisphere shape. The plurality of support portions 133 may be provided on the inner surface of the insulating part 130 to be spaced apart from one another at a predetermined interval.

Alternatively, as shown in FIG. 11, the support portion 133 may extend on the inner surface of the insulating part 130 along a perimeter of the insulating part 130.

In addition, as illustrated in FIG. 9, while the insulating part 130 is inserted into each of the joint portions 120*a* of the stator coils 120, the support portion 133 may be disposed at a position that faces the covering portion 122 and pressed by the covering portion 122 to be supported thereon.

Alternatively, as shown in FIG. 10, while the insulating part 130 is inserted into each of the joint portions 120*a* of the stator coils 120, the support portion 133 may be disposed at a position that faces at least one of the first and second conductors 121*a* and 121*b*, and pressed by the at least one of the first and second conductors 121*a* and 121*b* to be supported thereon. The support portion 133 may be provided in plurality. In addition, the plurality of support portions 133 may be disposed at different heights of the insulating part 130. The plurality of support portions 133 may have different sizes.

The support portion 133 may allow the insulating part 120 to be more securely coupled to the joint portions 120*a* while being inserted into the joint portions 120*a* of the stator coils 120. Accordingly, even when impact or shock is applied to the stator 100, or vibration occurs, the insulating part 130 and the joint portions 120*a* may be securely coupled to each other.

Hereinafter, a method of manufacturing the stator 100 of FIGS. 1A and 1B will be described with reference to FIG. 12 in addition to FIGS. 1A to 11.

Figure 12:
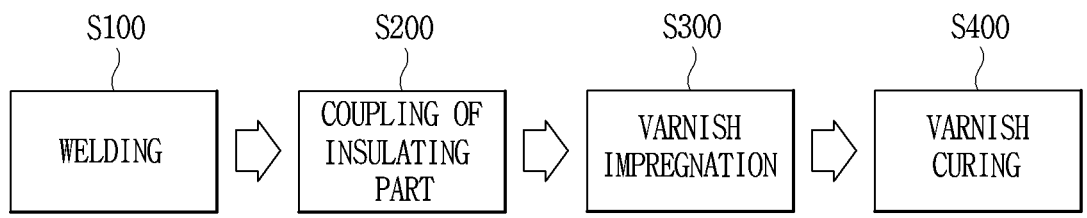
FIG. 12 is a flowchart of a method of manufacturing the stator in FIGS. 1A and 1B.

FIG. 12 is a flowchart illustrating a method of manufacturing the stator 100 illustrated in FIGS. 1A and 1B.

Referring to FIG. 12, a method for manufacturing the stator 100 includes welding two ends of each of the stator coils 120 to form one joint portion 120*a* (S100), inserting the insulating part 130 into the joint portions 120*a* (S200), impregnating a coating material into the stator coils 120 (S300), and curing the coating material impregnated into the stator coils 120 (S400).

More specifically, the method of manufacturing the stator 100 is as follows. First, two ends of each of the stator coils 120 wound on the stator core 110 of the stator 100 are welded together to form one joint portion 120*a*. Here, each of the stator coils 120 may be formed in a U shape to be wound around the stator core 110. In addition, the two ends of each of the stator coils 120 may be made of bare copper that is uncoated.

Next, the insulating part 130 made of a dielectric material, formed as a single body, and provided with a plurality of openings 130*a* is inserted into the joint portions 120*a* of the stator coils 120 through the openings 130*a* to be fixed.

Subsequently, while the insulating part 130 is coupled to the joint portions 120*a* of the stator coils 120, a coating material is impregnated into the stator coils 120 to form a film thereon. Here, the coating material may be varnish. The coating material may be impregnated not only into the stator coils 120, but also into an outer surface of the insulating part 130 coupled to the joint portions 120*a* of the stator coils 120.

Next, the coating material impregnated into the stator coils 120 is cured.

In the manufacturing process of the stator core 100, an epoxy coating (or application) step performed for insulating the joint portions 120*a* of the stator coils 120, which is included in the conventional stator manufacturing process is not required. As a result, a time required for the manufacturing process of the stator 100 may be greatly reduced.

For reference, the epoxy coating step included in the manufacturing process of the related art stator may be performed on the joint portions 120*a* of the stator coils 120 after the step S100 of welding two ends of each of the stator coils 120 to form one joint portion 120*a*, the step S300 of impregnating the coating material into the stator coils 120, and the step S400 of curing the coating material impregnated into the stator coils 120.

According to the embodiments disclosed herein, a stator includes stator coils, each having two ends electrically connected to form one joint portion and an insulating part inserted into each of the joint portions through a plurality of openings provided at one side thereof to cover at least respective parts of the joint portions, so as to allow a distance between neighboring joint portions to be maintained. Here, the insulating part is made of a dielectric material, has a plurality of accommodation spaces partitioned from one another, and formed as a single body.

A predetermined distance between the neighboring joint portions of the stator coils may be securely maintained by coupling the insulating part having the plurality of partitioned accommodation spaces to the plurality of joint portions of the stator coils through the openings. As a result, a partial discharge caused by a surge between the joint portions of the stator coils may be prevented, allowing operational reliability of the stator to be increased. Further, as the insulating part is formed as the single body, an assembly process of coupling the insulating part to the joint portions of the stator coils may be performed in an easier manner.

Owing to the insulating part made of the dielectric material and inserted into and coupled to the joint portions of the stator coils, an epoxy coating step performed for insulating the joint portions of the stator coils, which is included in the conventional stator manufacturing process, may not be required. Further, insulation area (or region) may be formed more evenly or uniformly compared to the conventional insulation method of epoxy coating on the joint portions of the stator coils. As a result, insulation performance required for the joint portions of the stator coils may be improved.

What is claimed is:
1. A stator, comprising:
a stator core having a plurality of slots;

a plurality of stator coils inserted into the plurality of slots and wound on the stator core, each of the plurality of stator coils having two ends electrically connected to form a joint portion; and an insulating part made of a dielectric material, formed as a single body, having a plurality of openings, joint portions of the plurality of stator coils being inserted into the insulating part through the openings, the insulating part being configured to cover at least respective parts of the joint portions and provide a distance between neighboring joint portions, wherein each of the plurality of stator coils comprises:
a first conductor and a second conductor configured to allow electric current to flow therethrough, the first conductor and the second conductor defining the two ends of the stator coil, respectively; and
covering portions configured to cover respective parts of the first and second conductors, excluding the joint portion, and provide protection, wherein the insulating part partially covers the covering portions, and wherein the insulating part further comprises a support portion protruding from an inner surface thereof, the support portion being configured to be elastically deformable.

2. The stator of claim 1, wherein the plurality of openings are disposed on a first side of the insulating part, and
wherein a second side disposed opposite the first side is closed.

3. The stator of claim 1, wherein the support portion is disposed on a portion of the insulating part facing the covering portion, and the support portion is disposed between the insulating portion and the covering portion.

4. The stator of claim 1, wherein the support portion is disposed on a portion of the insulating part facing at least one of the first and second conductors, and the support portion is disposed between the insulating portion and at least one of the first and second conductors.

5. The stator of claim 1, wherein the support portion has a hemispherical shape.

6. The stator of claim 1, wherein the support portion extends on an inner surface of the insulating part along a perimeter of the insulating part.

7. The stator of claim 1, wherein the insulating part further includes a plurality of accommodation spaces partitioned from each other and inserted into each of the joint portions, and
wherein each of the accommodation spaces has a first inner diameter defining an area that surrounds the joint portion and a second inner diameter defining an area that surrounds the covering portions, so that the insulating part is engagingly supported by the covering portions when inserted into the joint portion.

8. The stator of claim 1, wherein the insulating part includes a first insulating portion and a second insulating portion made of different types of dielectric materials.

9. The stator of claim 8, wherein the first insulating portion defines an inner side of the insulating part and has a first Young's modulus, and
wherein the second insulating portion defines an outer side of the insulating part and has a second Young's modulus higher than the first Young's modulus.

10. The stator of claim 1, wherein the insulating part further includes an adhesive layer provided on an inner surface thereof.

11. The stator of claim 1, wherein the insulating part comprises:
a first portion defining an upper surface thereof; and
a second portion defining a side surface thereof,
wherein a thickness of the first portion is less than a thickness of the second portion.

12. The stator of claim 1, wherein the dialectic material has a dielectric constant ranging between 3 and 5.

13. The stator of claim 12, wherein the dielectric material includes at least one of Polyimide (PI), Polyamideimide (PAI), and Polyetheretherketone (PEEK).

14. The stator of claim 1, wherein the plurality of stator coils is spaced apart from one another along a circumference of the stator core by a predetermined interval, and
wherein the insulating part has a ring shape to cover the joint portions of the plurality of stator coils.

15. A method of manufacturing the stator of claim 1, the method comprising:
welding two ends of each of the plurality of stator coils wound on the stator core to form the joint portion;
inserting joint portions of the plurality of stator coils into the plurality of openings in the insulating part made of the dielectric material;
impregnating a coating material into the plurality of stator coils to form a film thereon; and
curing the impregnated coating material.

16. The method of claim 15, wherein the coating material includes varnish.

17. The method of claim 15, wherein the dielectric material has a dielectric constant ranging between 3 and 5.

* * * * *